US012411917B2

(12) United States Patent
Mizui et al.

(10) Patent No.: US 12,411,917 B2
(45) Date of Patent: Sep. 9, 2025

(54) AUTHENTICATION SYSTEM AND TRACKING SYSTEM

(71) Applicant: DENSO CORPORATION, Kariya (JP)

(72) Inventors: Tatsuya Mizui, Kariya (JP); Yuichi Yoshida, Tokyo (JP); Mitsuru Ambai, Tokyo (JP)

(73) Assignee: DENSO CORPORATION, Kariya (JP)

( * ) Notice: Subject to any disclaimer, the term of this patent is extended or adjusted under 35 U.S.C. 154(b) by 197 days.

(21) Appl. No.: 18/469,383

(22) Filed: Sep. 18, 2023

(65) Prior Publication Data

US 2024/0004972 A1   Jan. 4, 2024

Related U.S. Application Data

(63) Continuation of application No. PCT/JP2022/010789, filed on Mar. 11, 2022.

(30) Foreign Application Priority Data

Mar. 19, 2021   (JP) ................... 2021-046202

(51) Int. Cl.
*G06F 21/30* (2013.01)
*G06T 3/40* (2024.01)
*G06V 10/44* (2022.01)
*G06V 10/75* (2022.01)

(52) U.S. Cl.
CPC ............ *G06F 21/30* (2013.01); *G06T 3/40* (2013.01); *G06V 10/44* (2022.01); *G06V 10/751* (2022.01)

(58) Field of Classification Search
CPC ...... G06F 21/30; G06V 10/751; G06V 10/44; G06T 3/40

USPC .......................................... 713/168
See application file for complete search history.

(56) References Cited

U.S. PATENT DOCUMENTS

| 9,721,150 B2* | 8/2017 | Gottemukkula | G06V 10/993 |
| 11,784,834 B2* | 10/2023 | Gorsica | G06F 21/44 |
| | | | 713/168 |
| 2007/0047809 A1* | 3/2007 | Sasaki | G06V 20/56 |
| | | | 382/170 |

(Continued)

FOREIGN PATENT DOCUMENTS

JP   2020190794 A   11/2020

*Primary Examiner* — Tauqir Hussain
(74) *Attorney, Agent, or Firm* — Harness, Dickey & Pierce, P.L.C.

(57) ABSTRACT

An authentication system includes: a first imaging device that images an individual object in a first stage to generate a registration image; a second imaging device that images an individual object to be authenticated in the second stage to generate an authentication image; and a registration device configured to authenticate the individual object to be authenticated, by extracting a registration partial image from the registration image with use of a registration template to acquire registration image information, extracting an authentication partial image from the authentication image with use of an authentication template to acquire authentication image information, and determining whether the authentication image information and the registration image information represent a same individual object, the authentication template corresponding to the registration template, and having, with respect to the registration template, a difference in accordance with a treatment/processing.

8 Claims, 7 Drawing Sheets

(56) References Cited

U.S. PATENT DOCUMENTS

| | | | |
|---|---|---|---|
| 2008/0037833 A1* | 2/2008 | Takahashi | H04L 9/3231 |
| | | | 382/115 |
| 2013/0194407 A1* | 8/2013 | Kim | G06V 40/197 |
| | | | 348/78 |
| 2016/0072774 A1* | 3/2016 | McRae | H04L 63/0428 |
| | | | 713/168 |
| 2016/0092752 A1* | 3/2016 | Nakashima | G06V 10/751 |
| | | | 382/190 |
| 2016/0275362 A1* | 9/2016 | Aoki | A61B 5/117 |
| 2016/0371535 A1* | 12/2016 | Li | G06V 40/172 |
| 2020/0111217 A1* | 4/2020 | Yokoyama | G06N 3/047 |
| 2020/0269074 A1* | 8/2020 | Inada | A61B 8/54 |
| 2023/0198745 A1* | 6/2023 | Vansteenkiste | G08B 13/19613 |
| | | | 713/168 |
| 2024/0004972 A1* | 1/2024 | Mizui | G06F 21/30 |

* cited by examiner

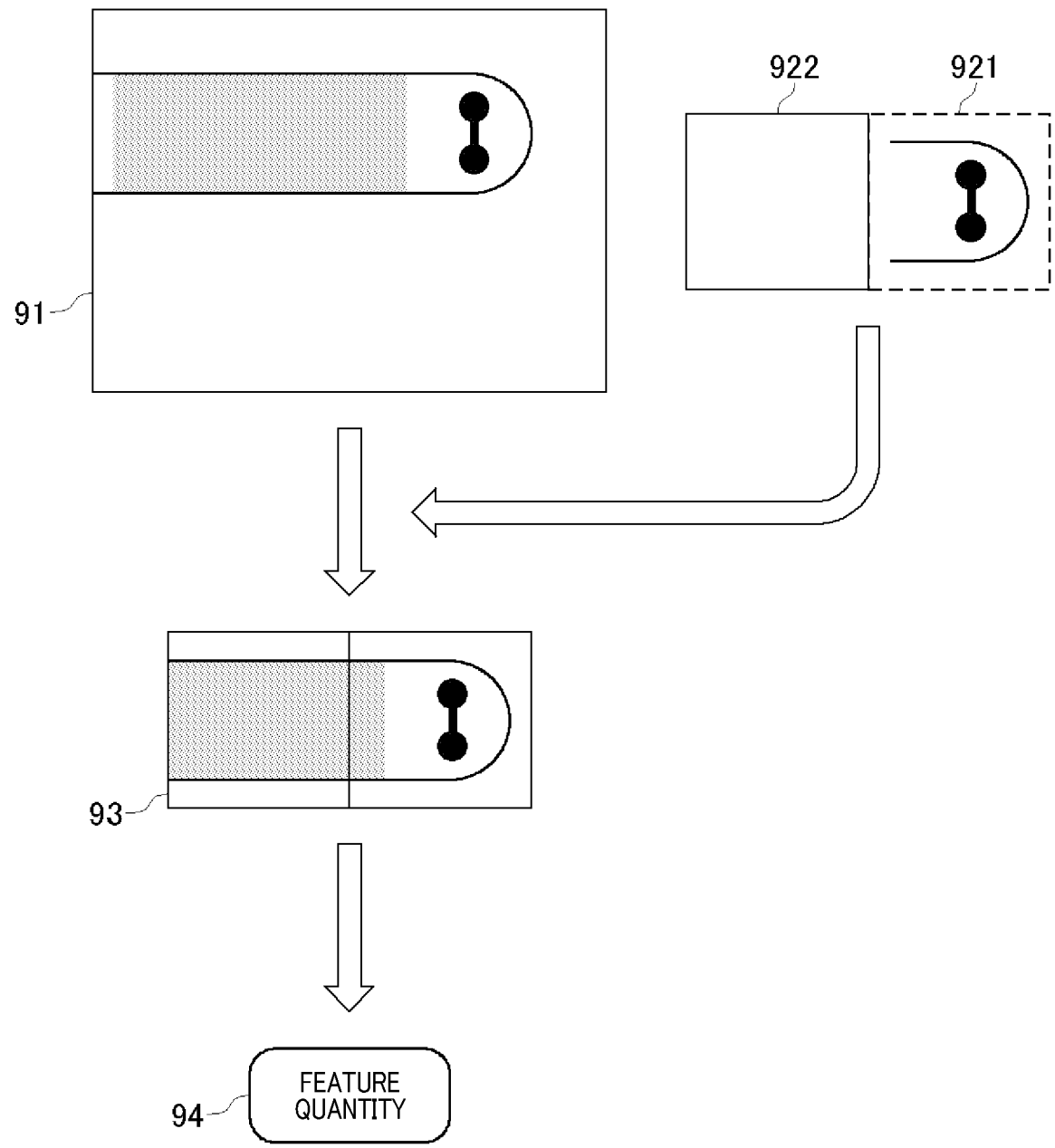

AUTHENTICATION SYSTEM AND TRACKING SYSTEM

CROSS-REFERENCE TO RELATED APPLICATION

The present application is a continuation application of International Application No. PCT/JP2022/010789, filed on Mar. 11, 2022, which claims priority to Japanese Patent Application No. 2021-046202, filed on Mar. 19, 2021. The contents of these applications are incorporated herein by reference in their entirety.

BACKGROUND

Technical Field

The present disclosure relates to a tracking system that tracks individual objects, and an authentication system for use in the tracking system, and more particularly, relates to a tracking system that tracks individual objects that undergo a first stage, a second stage, and a treatment and/or processing between the first stage and the second stage, and an authentication system for use in the tracking system.

Background Art

In processes for manufacturing an article, the article is completed through multiple steps such as sintering, polishing, and cleaning, for example. In such processes, if an article in a certain downstream stage or finished article is found to have a problem, the conditions of the individual object in the upstream steps (for example, the manufacturing conditions, and the conditions of the individual object itself) can be desirably tracked (traced back). In addition, if a certain upstream stage is found to have a problem, products that have undergone the problematic upstream step can be desirably tracked from among the downstream articles or finished articles (traced forward). In this case, as long as identifying information unique to the article itself can be provided by a method such as writing code information or providing RFID tags, the individual objects themselves can be tracked with such identifying information.

SUMMARY

In the present disclosure, provided is an authentication system as the following.

The authentication system includes: a first imaging device that images an individual object in the first stage to generate a registration image; a registration image information acquisition unit configured to extract a registration partial image from the registration image with use of a registration template to acquire registration image information; a second imaging device that images an individual object to be authenticated in the second stage to generate an authentication image; an authentication image information acquisition unit configured to extract an authentication partial image from the authentication image with use of an authentication template to acquire authentication image information, the authentication template corresponding to the registration template, and having, with respect to the registration template, a difference in accordance with the treatment and/or processing; and an authentication unit configured to determine whether the authentication image information and the registration image information represent a same individual object to authenticate the individual object to be authenticated.

BRIEF DESCRIPTION OF THE DRAWINGS

The above-mentioned objects of the present disclosure, and other objects, features, and advantages will become more apparent from the following description with reference to the accompanying drawings below.

FIG. 7 is a diagram illustrating a processing in an authentication device according to the second embodiment.

DETAILED DESCRIPTION OF THE PREFERRED EMBODIMENTS

Figure 1:
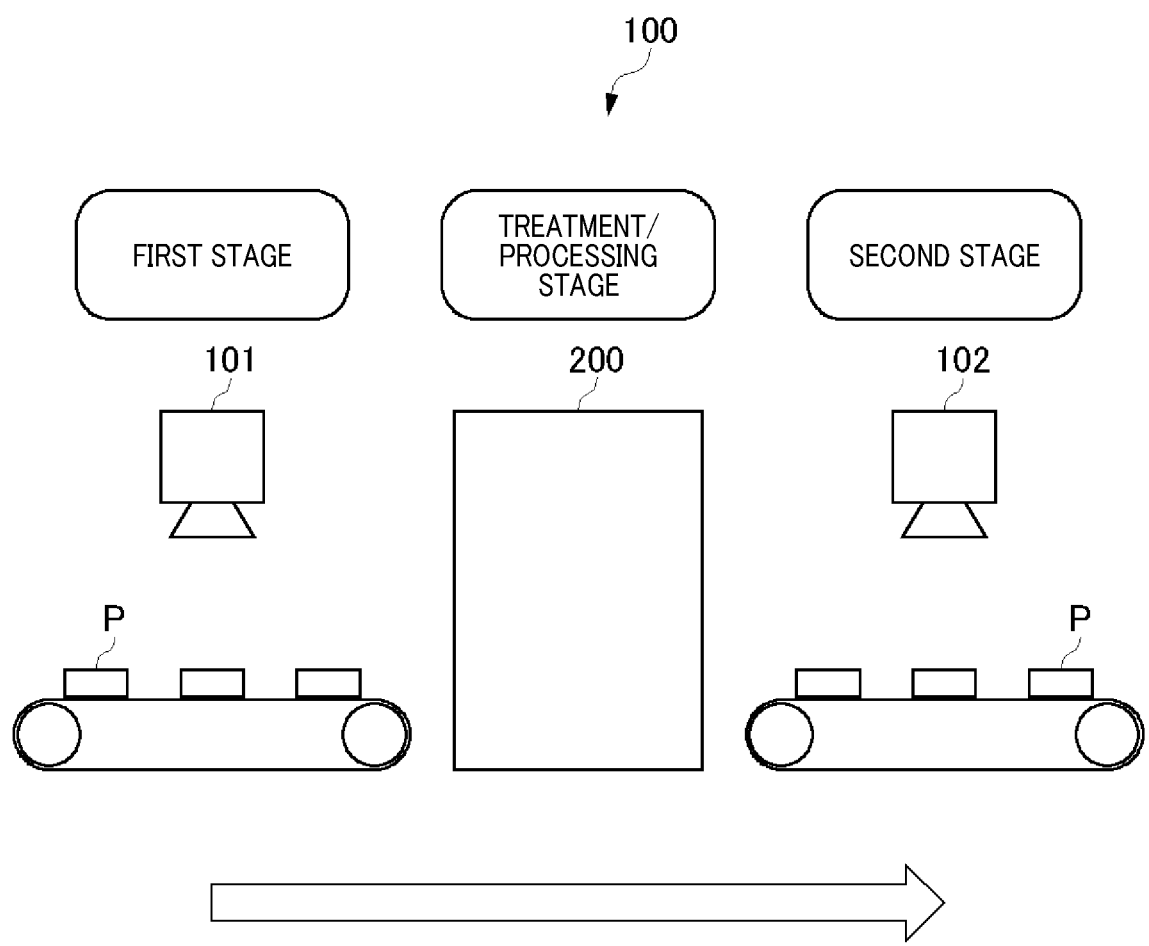
FIG. 1 is a diagram illustrating the overall configuration of a tracking system according to a first embodiment.

Depending on the articles, however, it may be difficult to provide identifying information in some cases, and in the first place, providing each individual object for the articles with identifying information will cause an increase in cost. Techniques of tracking articles using patterns (for example, patterns of shapes, locations, or the like of minute scratches on the surfaces) occurring by chance, rather than intentionally, as identifying information, for articles that undergo treatment or processing, have been proposed (for example, PTL 1). Such patterns become unique for each individual object, and can function as identifying information, because the patterns are provided by chance.

[PTL 1] JP 2020-190794 A

Incidental patterns that appear for each of a plurality of articles of the same type function as identifying information. When extensive patterns of the articles are considered as identifying information, however, the amount of information to be stored will be increased. For this reason, images of the same partial region from the plurality of articles of the same type are used as identifying information. For example, a part where a difference in pattern is likely to appear by chance is selected as the partial region.

In processes for manufacturing articles, however, upstream and downstream may fail to conform with each other in the appearance of the partial region in the articles, depending on various types of treatment or processing. For example, the articles may be deformed by the manufacturing processes in some cases. In addition, an intentional pattern to serve as a reference for identifying the partial region may be also changed in some cases. In these cases, the corresponding partial region will fail to be extracted from an image of the upstream item and an image of the downstream item, and matching between the image of the upstream item and the image of the downstream item will fail to be executed.

Accordingly, an object of the present disclosure is to provide an authentication system capable of tracking an individual object before and after undergoing a treatment or processing, even when the individual object undergoes a change in appearance by the treatment or processing, and a tracking system using the authentication system.

For solving the problems mentioned above, an authentication system according to an aspect of the present disclosure is an authentication system configured to authenticate an individual object that undergoes a first stage, a second stage, and a treatment and/or processing between the first stage and the second stage, the authentication system including: a first imaging device that images an individual object in the first stage to generate a registration image; a registration image information acquisition unit configured to extract a registration partial image from the registration image with use of a registration template to acquire registration image information; a second imaging device that images an individual object to be authenticated in the second stage to generate an authentication image; an authentication image information acquisition unit configured to extract an authentication partial image from the authentication image with use of an authentication template to acquire authentication image information, the authentication template corresponding to the registration template, and having, with respect to the registration template, a difference in accordance with the treatment and/or processing; and an authentication unit configured to determine whether the authentication image information and the registration image information represent a same individual object to authenticate the individual object to be authenticated.

This configuration allows the individual object to be authenticated even when the individual object undergoes a change in appearance due to the treatment and/or processing, because different templates are used as the registration template for acquiring the registration image information and the authentication template for acquiring the authentication image information, depending on the appearance of the individual object in each stage.

The authentication system mentioned above may further include a storage device that stores multiple pieces of the registration image information generated for a plurality of individual objects of the same type, and the authentication unit may be configured to search, from among the multiple pieces of registration image information stored in the storage device, the registration image information that represents a same individual object as an individual object represented by the authentication image information, with the authentication image information as a query, thereby authenticating the individual object to be authenticated.

This configuration allows the individual object to be tracked by being traced back.

In the authentication system mentioned above, the authentication unit may be configured to determine whether the authentication image information and the registration image information represent a same individual object, for each of multiple pieces of the authentication image information obtained for the plurality of individual objects of the same type, thereby authenticating the individual object to be authenticated.

This configuration allows the individual object to be tracked by being traced forward.

In the authentication system mentioned above, the registration image information acquisition unit may be configured to resize the registration partial image, based on the size of the individual object in the first stage, to acquire the registration image information, and/or the authentication image information acquisition unit may be configured to resize the authentication partial image, based on the size of the individual object in the second stage, to acquire the authentication image information.

This configuration allows the registration image and the authentication image to provide partial images that are equal in the size. Thus, pattern matching allows collation between the registration image information and the authentication image information to execute authentication.

In the authentication system mentioned above, the registration image information acquisition unit may be configured to extract a feature quantity from the registration partial image to acquire the registration image information, and the authentication image information acquisition unit may be configured to extract a feature quantity from the authentication partial image to acquire the authentication image information.

This configuration allows authentication to be performed with use of the feature quantities.

In the authentication system mentioned above, the registration image information acquisition unit may be configured to extract, as the registration partial image, a region corresponding to the registration template in the registration image to acquire the registration image information, and the authentication image information acquisition unit may be configured to extract, as the authentication partial image, a region corresponding to the authentication template in the authentication image, to acquire the authentication image information.

This configuration allows authentication to be executed by extracting the regions corresponding to the templates.

In the authentication system mentioned above, the registration image information acquisition unit may be configured to extract, as the registration partial image, a region in a predetermined positional relationship with a region corresponding to the registration template in the registration image to acquire the registration image information, and the authentication image information acquisition unit may be configured to extract, as the authentication partial image, a region in the predetermined positional relationship with a region corresponding to the authentication template in the authentication image to acquire the authentication image information.

This configuration allows the regions corresponding to the templates and the region for use in authentication to be set in an arbitrary manner.

A tracking system according to an aspect of the present disclosure is a tracking system configured to track an individual object that undergoes a first stage, a second stage, and a treatment and/or processing between the first stage and the second stage, the tracking system including: a treatment/processing device that applies a treatment and/or processing to the individual object between the first stage and the second stage to change the appearance of the individual object; a first imaging device that images an individual object in the first stage to generate a registration image; a registration image information acquisition unit configured to extract a registration partial image from the registration image with use of a registration template to acquire registration image information; a second imaging device that images an individual object in the second stage to generate an authentication image; an authentication image information acquisition unit configured to extract an authentication partial image from the authentication image with use of an authentication template to acquire authentication image information, the authentication template corresponding to the registration template, and having, with respect to the registration template, a difference in accordance with the treatment and/or processing; and an authentication unit configured to determine whether the authentication image information and the registration image information represent a same individual object to authenticate the individual object to be authenticated.

This configuration also allows the individual object to be authenticated even when the individual object undergoes a change in appearance due to the treatment and/or processing, because different templates are used as the registration template for acquiring the registration image information and the authentication template for acquiring the authentication image information, depending on the appearance of the individual object in each stage.

First Embodiment

FIG. 1 is a diagram illustrating the overall configuration of a tracking system according to a first embodiment. The tracking system 100 according to the present embodiment is applied to a system that manufactures an article. The article is subjected to a predetermined processing and/or processing (hereinafter, referred to as a "treatment/processing") in a treatment/processing stage. In the following description, the former stage of the treatment/processing stage is referred to as a first stage, and the latter stage of the treatment/processing stage is referred to as a second stage.

The article is subjected to a treatment/processing in the treatment/processing stage which changes the appearance of the article. For example, the article is reduced or increased in size by shrinkage or expansion of the article, or the aspect ratio thereof is changed. In addition, the appearance or pattern of a part of the surface may be changed by the treatment/processing, and furthermore, the shape of the article itself may be changed by cutting the article or adding another component thereto.

At the same time, the surface of the article has a pattern, which occurs by chance in the manufacturing process. For example, a large number of thin lines occurring when the surface of the article is subjected to hairline finish visually seems to occur as a similar pattern for any individual object, but differs depending on the individual object when observed under magnification. In addition, also without any surface processing performed, a pattern of fine scratches unintentionally made at the surface of the article also differs depending on the individual object. Furthermore, the material itself of the article may have a pattern unique to each individual object (for example, that of wood grain).

These patterns differ depending on the individual object, and can be used as information for individual object identification. In the present embodiment, of these patterns appearing at the surface of the article, the pattern with a feature maintained even after undergoing treatment/processing is used as information for individual object identification.

The tracking system 100 includes a first camera 101 that photographs an article P in a first stage, a treatment/processing device 200 that applies a treatment/processing to the article P fed from the first stage, and a second camera 102 that photographs the article P in a second stage, after being subjected to treatment/processing in the treatment/processing device 200, to generate images. The tracking system 100 according to the present embodiment is a trace back tracking system in which a specific individual object is authenticated by registering the article P in the first stage and then identifying the article P in the first stage which corresponds to the specific individual object in the second stage.

It is to be noted that while FIG. 1 shows an example in which the article P is conveyed along a belt conveyor in the order of the first stage, the treatment/processing stage, and the second stage, the conveyance of the article is not limited to the example, and may be carried out with a robot arm or by manned operation. In addition, the article P in the second stage may be a finished product subjected to the complete manufacturing process.

Figure 2:
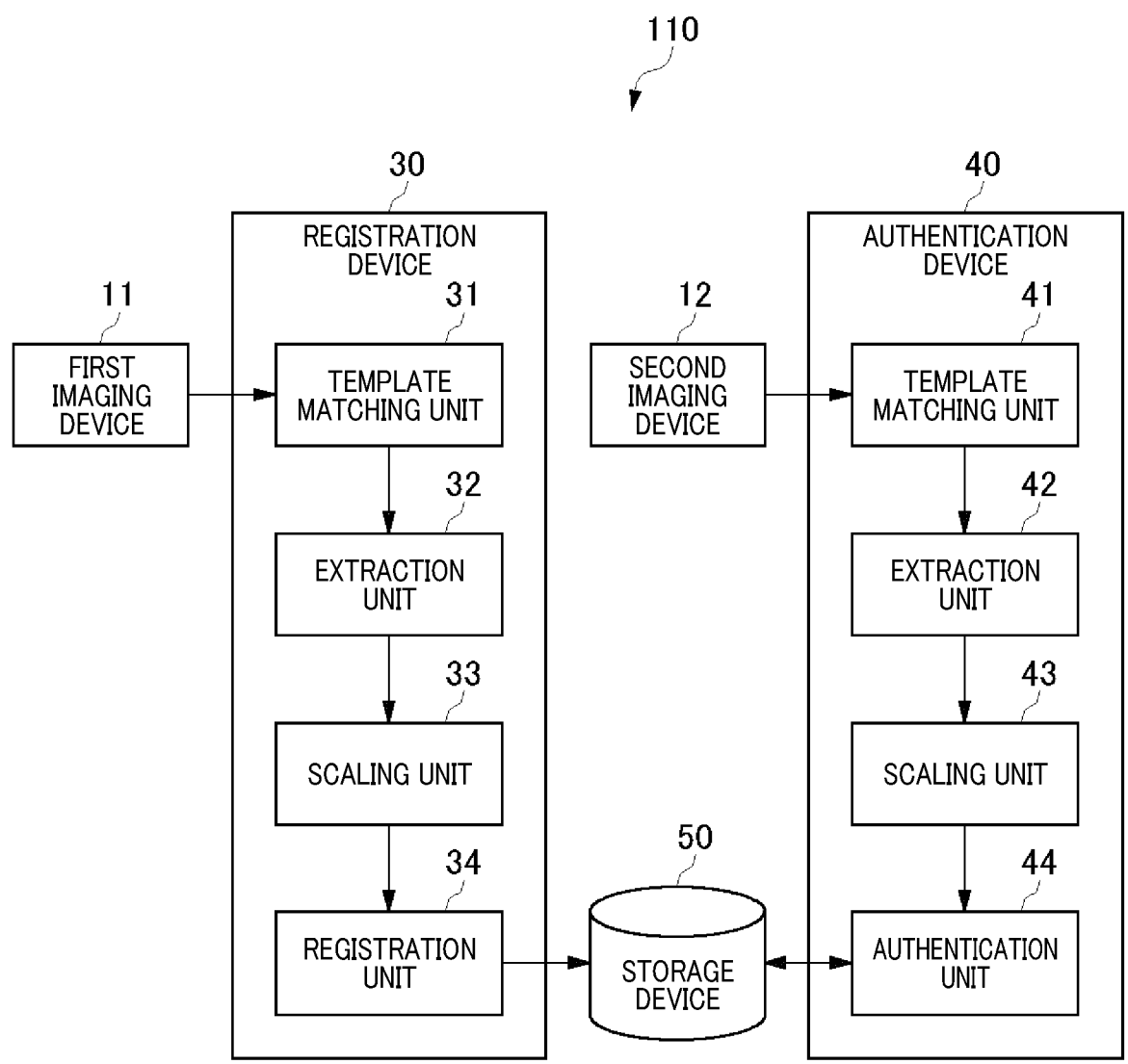
FIG. 2 is a block diagram illustrating the configuration of an authentication system according to the first embodiment.

FIG. 2 is a block diagram illustrating the configuration of an authentication system according to the first embodiment. The authentication system 110 includes a first imaging device 11, a second imaging device 12, a registration device 30, an authentication device 40, and a storage device 50. The imaging device 11 and the imaging device 12 respectively correspond to the first camera 101 and the second camera 102.

Figure 3:
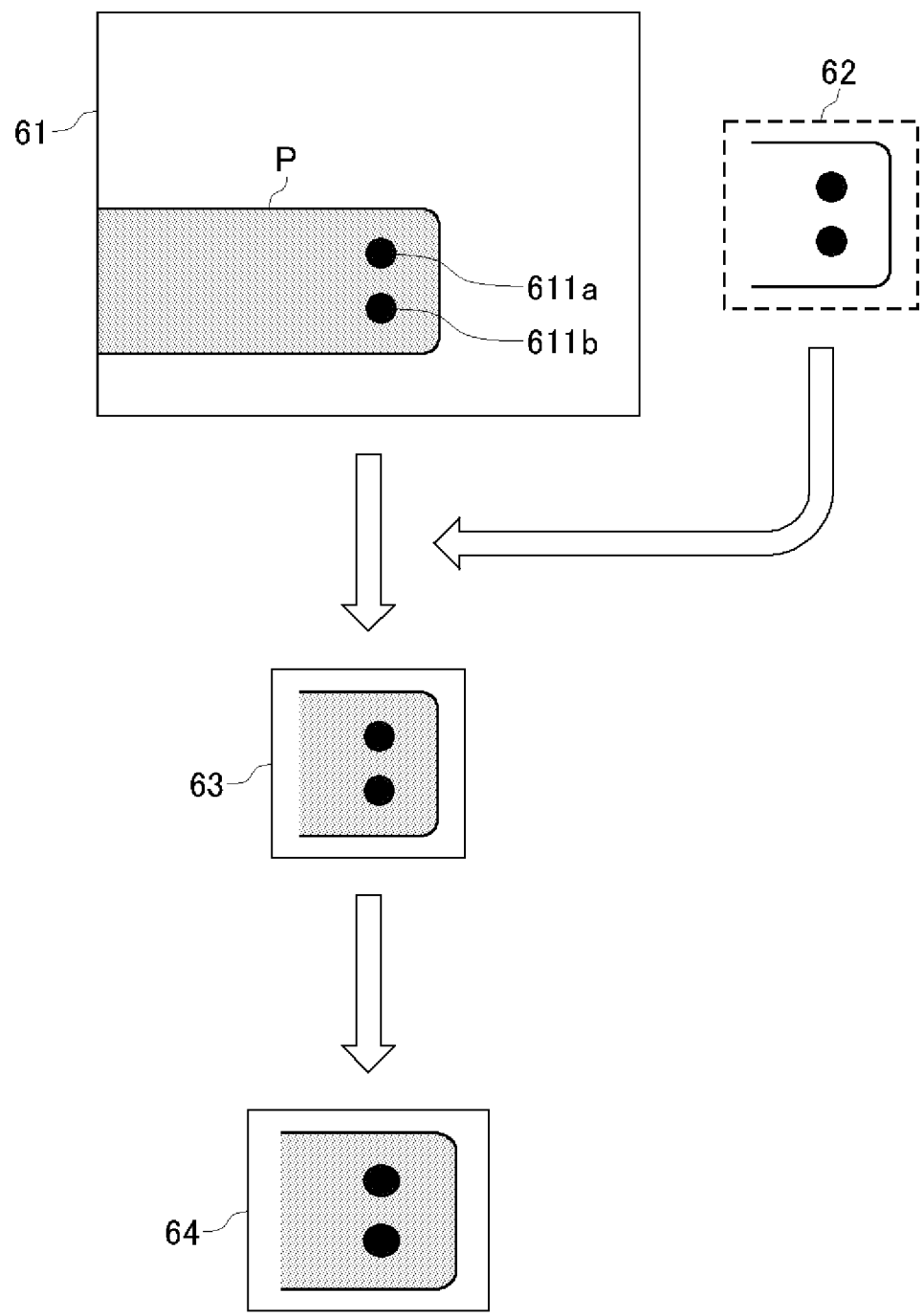
FIG. 3 is a diagram illustrating a processing in a registration device according to the first embodiment.
Figure 4:
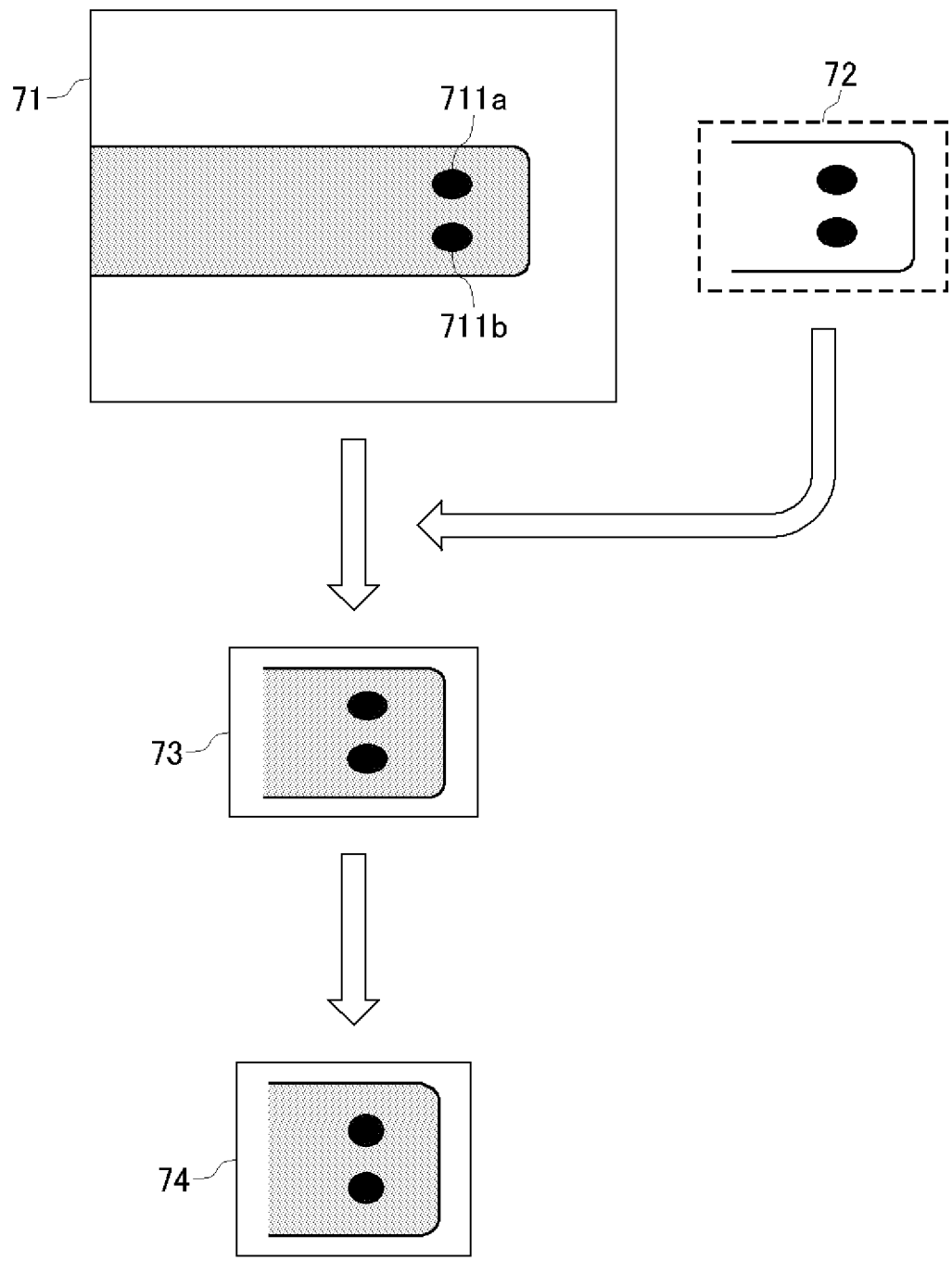
FIG. 4 is a diagram illustrating a processing in an authentication device according to the first embodiment.

FIG. 3 is a diagram illustrating a processing in a registration device according to the first embodiment, and FIG. 4 is a diagram illustrating a processing in an authentication device according to the first embodiment. The first imaging device 11 photographs an individual object in a first stage to generate a registration image. An image 61 in FIG. 3 is an example of the image generated by the first imaging device 11. In the present embodiment, the article P is a rectangular plate-shaped object with two processing marks 611a and 611b at a right end part.

The registration device 30 registers the article P in the first stage. The registration device 30 includes a template matching unit 31, an extraction unit 32, a scaling unit 33, and a registration unit 34. It is to be noted that the registration unit 30 may be achieved by execution of a registration program according to the present embodiment by a processor of a general-purpose information processing device including the processor, a memory, a storage device, and the like.

The template matching unit 31 stores a template 62 for registration to be applied to a registration image. This template 62 for registration is intended to represent an image feature that is common to a plurality of articles in a first stage. In the example of FIG. 3, the template 62 for registration is a template corresponding to the right end part of the article P in the first stage. The right end of the article P has the two processing marks, which are characteristic, and thus, template matching can be easily carried out.

The extraction unit 32 extracts, as a partial image 63 for registration, a region of the registration image where the template 62 for registration is subjected to mapping by template matching. The scaling unit 33 resizes the partial image 63 for registration, extracted by the extraction unit 32, as a resized partial image 64 for registration so as to reach a predetermined size and aspect ratio. The registration unit 34 stores the resized partial image 64 for registration as image information for registration in the storage device 50.

In the first stage, a plurality of article P of the same type to be manufactured are photographed and registered in order as mentioned above. Thus, the storage device 50 stores image information for registration on the plurality of article P to be manufactured. The storage device 50 stores, in relation to the image information for registration for each article P, information on the article P, such as identification numbers, and information on the manufacture of the article P, for example, such as a manufacturing date, a manufacturing lot, and a manufacturing line. Thus, the article P in the second stage and the subsequent stages can be authenticated to identify whether the article P correspond to any of the article registered in the storage device 50, and then obtain information on the manufacture of the article P.

The second imaging device 12 photographs an individual object to be authenticated in a second stage to generate an authentication image. An image 71 in FIG. 4 is an example of the image generated by the second imaging device 12.

According to the present invention, the article P is shrunk in a vertical direction and extended in a horizontal direction, as compared with the article P before undergoing the treatment/processing. The processing marks 611a and 611b in the first stage are deformed in accordance with the deformation of the article P to become processing marks 711a and 711b.

The authentication device 40 authenticates article P to be authenticated in the second stage. For example, an article found to be defective in the second stage is considered as a target to be authenticated. The authentication device 40 includes a template matching unit 41, an extraction unit 42, a scaling unit 43, and an authentication unit 44. It is to be noted that the authentication device 40 may be achieved by execution of an authentication program according to the present embodiment by a general-purpose information processing device including a processor, a memory, a storage device, and the like.

The template matching unit 41 stores a template 72 for authentication to be applied to an authentication image. This template 72 for authentication is intended to represent an image feature that is common to a plurality of articles in a second stage. This image feature is the same as the image feature represented by the template 62 for registration. In the examples of FIGS. 3 and 4, the template 62 for registration and the template 72 for authentication both correspond to the right end part of the article P with the processing marks. The template 72 for authentication is, however, obtained by deforming the template 62 for registration in response to the article appearance changed by the treatment/processing. More specifically, the template 72 for authentication corresponds to the registration template, and has, with respect to the template 62 for registration, a difference in accordance with a treatment/processing in a treatment/processing stage.

The extraction unit 42 extracts, as a partial image 73 for authentication, a region of the authentication image where the authentication template is subjected to mapping by template matching. The scaling unit 43 resizes the partial image 73 for authentication, extracted by the extraction unit 42, as a resized partial image 74 for authentication so as to reach predetermined size and aspect ratio. The scaling unit 43 executes processing to zoom in or out of the resized partial image 74 for authentication such that the article P to be authenticated has the same size and aspect ratio as those of the resized registration partial image.

The authentication unit 44 searches, from among multiple pieces of resized registration image information stored in the storage device 50, the registration image information that represents the same individual object as the individual object represented by resized authentication image information, with the resized authentication image information as a query, thereby authenticating the individual object to be authenticated. Specifically, the authentication unit 44 executes pattern matching with the resized authentication image information as a query, thereby searching, from among the multiple pieces of resized registration image information stored in the storage device 50, the resized registration image information corresponding to the resized authentication image information.

As described above, according to the present embodiment, even when the appearance of an object is changed by a treatment/processing, the corresponding part can be extracted from images of the object before and after undergoing the change, because a registration template that is used for the unchanged article in the first stage, deformed in accordance with the changed appearance of the article, is used as an authentication template that is used for the changed article in the second stage. In addition, also in resizing the extracted partial image, the extracted partial image is resized such that the size of the changed article in the second stage matches the size of the unchanged article in the first stage, thus allowing a registered resized registration partial image and a resized authentication partial image to conform in size with each other, and making it easy to search the resized registration partial image corresponding to the resized authentication partial image.

It is to be noted that while the registration device 30 and the authentication device 40 both respectively include the scaling units 33 and 43 in the embodiment mentioned above, optionally only one of the devices may have the scaling unit. More specifically, the scaling unit provided for one of the devices may be intended to resize extracted images such that the article in an extracted image in one of the devices has the same size as that of the article in an extracted image in the other.

Second Embodiment

Figure 5:
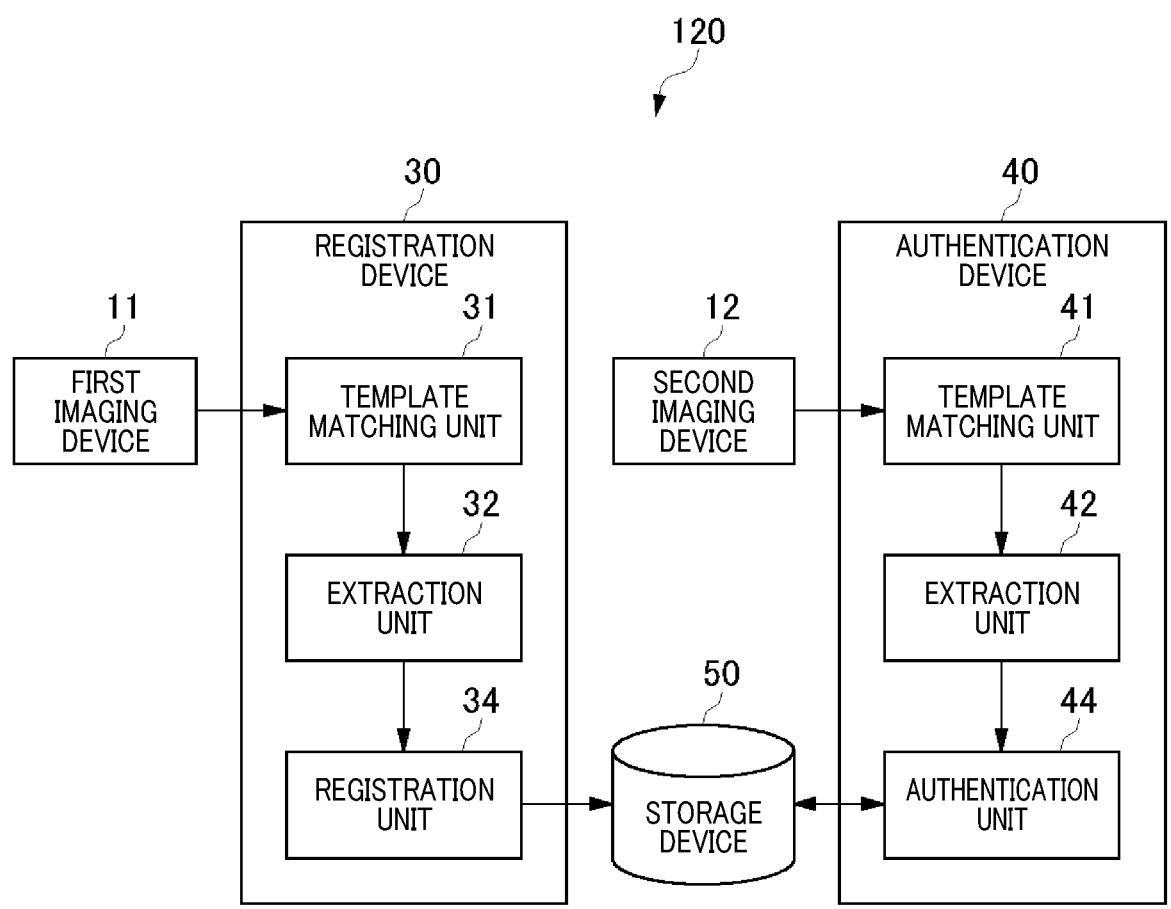
FIG. 5 is a block diagram illustrating the configuration of an authentication system according to a second embodiment.

FIG. 5 is a block diagram illustrating the configuration of an authentication system according to a second embodiment. In the authentication system 120, the same configurations as those of the authentication system 110 according to the first embodiment are denoted by the same reference numerals, and descriptions of the configurations will be appropriately omitted. The authentication system 120 according to the present embodiment does not have the scaling unit 33 in the registration device 30 and the scaling unit 43 in the authentication device 40, as compared with the authentication system 110 according to the first embodiment. More specifically, according to the present embodiment, feature quantities are extracted for authentication as described later, and thus, there is no need for scaling to conform a registration partial image and an authentication partial image in size with each other.

According to the first embodiment, the extraction unit 32 extracts, as a registration partial image, a region of the registration image where the registration template is subjected to mapping, and the extraction unit 42 extracts, as an authentication partial image, a region of the authentication image where the authentication template is subjected to mapping. According to the present embodiment, the extraction unit 32 and the extraction unit 42 each extract a region in a predetermined positional relationship with a template, rather than extracting the region itself where the template is subjected to mapping.

Figure 6:
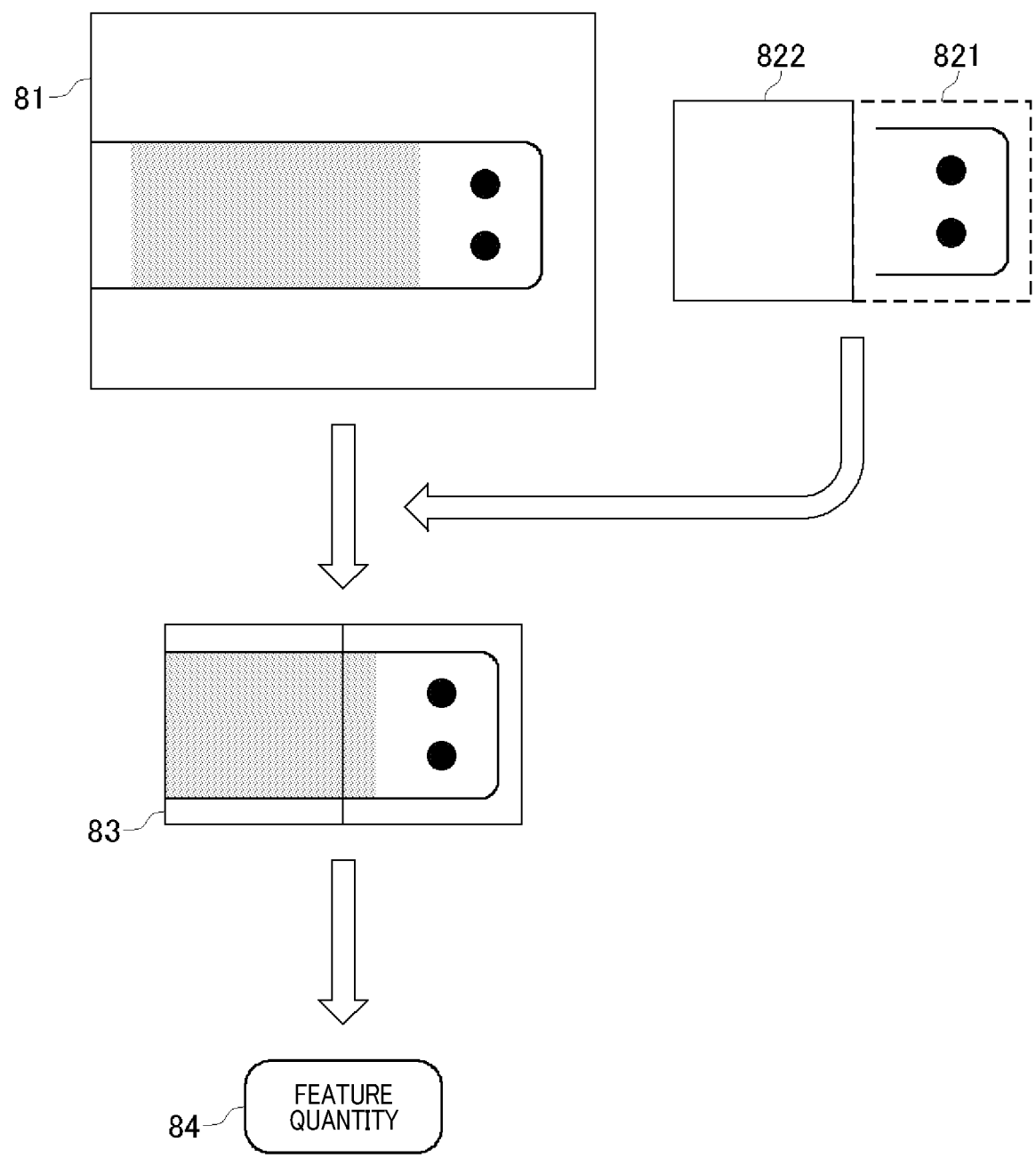
FIG. 6 is a diagram illustrating a processing in a registration device according to the second embodiment.

FIG. 6 is a diagram illustrating a processing in a registration device according to the second embodiment, and FIG. 7 is a diagram illustrating a processing in an authentication device according to the second embodiment. According to the present disclosure, for a plurality of articles in the same stage, a template is set for parts that have a characteristic appearance common to the articles, and a region where an appearance that differs from individual object to individual object appears clearly is set as an extracted region. In addition, a highly autocorrelated part where the feature common to the plurality of articles appears is disadvantageous as an extracted region, and thus regarded as a region for the template.

In the examples of FIGS. 6 and 7, templates are set for a right end part of article as in the first embodiment. It is to be noted that while the examples of FIGS. 6 and 7 have a processing mark added and end corners chamfered to change also the shape of the article in the second stage as compared with the first stage, a template that is suitable for the changed article is prepared as an authentication template in the second stage in consideration of such changes in appearance as in the first embodiment, and thus, in spite of such changes, the same part of the article can be identified in the first stage and the second stage.

In addition, while extracted regions 822 and 922 are set respectively so as to be adjacent to a template 821 for registration and a template 921 for authentication in the examples of FIGS. 6 and 7, the templates and the extracted regions are not required to be adjacent to each other, as long as the positional relationships are fixed between the templates and the extracted regions.

In addition, a registration unit 34 according to the present embodiment extracts feature quantities (for example, a feature quantity SIFT and a feature quantity HoG) 84 from a partial image 83 for registration, extracted by the extraction unit 32, and stores the feature quantities 84 as image information for registration in a storage device 50. In addition, an authentication unit 44 also extracts a feature quantity 94 from a partial image 93 for authentication, extracted by the extraction unit 42, in the same manner as the registration unit 34, and searches the feature quantity 84 corresponding to the extracted feature quantity 94 from the multiple feature quantities 84 stored in the storage device 50.

According to the present embodiment, the templates for identifying a corresponding part in an article and the extracted regions that are extracted as highly identified regions can be each independently set. Accordingly, the precision of the template matching and authentication can be improved, and the processing load can be reduced to improve the processing speed.

Third Embodiment

According to the first and second embodiments, the authentication systems 110 and 120 each register a plurality of articles of the same type in the first stage before a treatment/processing stage, and search, from among the plurality of articles registered, the article corresponding to a target to be identified, while an article that require search for the information on the first stage, such as a problematic article, are considered as the target to be identified, in the second stage that is downstream from the first stage, after undergoing the treatment/processing stage (trace back).

The present embodiment assumes, for example, a case in which if a problematic article in the first stage is found after a treatment/processing stage, the problematic article is found in the second stage (trace forward). The authentication system according to the present embodiment may have the same configuration as that according to the first or second embodiment. According to the present embodiment, the registration device 30 registers a plurality of articles in the first stage in the storage device 50. If any problem is exposed, the individual object with the problem is identified from the contents in the storage device 50. For example, if the fact that a predetermined manufacturing line has a problem in a predetermined period of time is exposed later, the individual object with the problem is identified from among the articles registered in the storage device 50.

The authentication device 40 identifies the same individual object as the individual object identified above, from among a plurality of articles in the second stage. Specifically, the authentication unit 44 determines whether the authentication image information and the registration image information on the identified individual object represent the same individual object, for each of multiple pieces of authentication image information obtained in the second stage for a plurality of individual objects of the same type, thereby authenticating the individual object for each of the plurality of articles in the second stage.

While examples in which the articles are products that are manufactured in accordance with manufacturing processes have been described in the first to third embodiments, the target to be authenticated or tracked by the authentication system or tracking system according to the present disclosure is not limited to any product, and the present disclosure is effectively applied to the target, as long as there is a plurality of targets of the same type, changed in appearance by a treatment, processing, or the like.

Although the present disclosure is described with reference to the examples, it is understood that the present disclosure is not to be considered limited to the examples, the structures, or the like. The present disclosure encompasses even various modification examples and modifications in the equivalent scope. In addition, various combinations and forms, and furthermore, other combinations and forms including only one element or more or less besides the various combinations and forms are even considered to fall within the scope or idea of the present disclosure.

What is claimed is:

1. An authentication system configured to authenticate an individual object that undergoes a first stage, a second stage, and a treatment and/or processing between the first stage and the second stage, the authentication system comprising:
   a first imaging device that images an individual object in the first stage to generate a registration image;
   a registration image information acquisition unit configured to extract a registration partial image from the registration image with use of a registration template to acquire registration image information;
   a second imaging device that images an individual object to be authenticated in the second stage to generate an authentication image;
   an authentication image information acquisition unit configured to extract an authentication partial image from the authentication image with use of an authentication template to acquire authentication image information, the authentication template corresponding to the registration template, and having, with respect to the registration template, a difference in accordance with the treatment and/or processing; and
   an authentication unit configured to determine whether the authentication image information and the registration image information represent a same individual object to authenticate the individual object to be authenticated.

2. The authentication system according to claim 1, further comprising a storage device that stores multiple pieces of the registration image information generated for a plurality of individual objects of the same type,
   wherein the authentication unit is configured to search, from among the multiple pieces of registration image information stored in the storage device, the registration image information that represents a same individual object as an individual object represented by the authentication image information, with the authentication image information as a query, thereby authenticating the individual object to be authenticated.

3. The authentication system according to claim 1, wherein the authentication unit is configured to determine whether the authentication image information and the registration image information represent a same individual object, for each of multiple pieces of the authentication image information obtained for the plurality of individual objects of the same type, thereby authenticating the individual object to be authenticated.

4. The authentication system according to claim 1, wherein the registration image information acquisition unit is configured to resize the registration partial image, based on a size of the individual object in the first stage, to acquire the registration image information, and/or the authentication image information acquisition unit is configured to resize the authentication partial image, based on a size of the individual object in the second stage, to acquire the authentication image information.

5. The authentication system according to claim 1, wherein the registration image information acquisition unit is configured to extract a feature quantity from the registration partial image to acquire the registration image information, and the authentication image information acquisition unit is configured to extract a feature quantity from the authentication partial image to acquire the authentication image information.

6. The authentication system according to claim 1, wherein the registration image information acquisition unit is configured to extract, as the registration partial image, a region corresponding to the registration template in the registration image, to acquire the registration image information, and the authentication image information acquisition unit is configured to extract, as the authentication partial image, a region corresponding to the authentication template in the authentication image, to acquire the authentication image information.

7. The authentication system according to claim 1, wherein the registration image information acquisition unit is configured to extract, as the registration partial image, a region in a predetermined positional relationship with a region corresponding to the registration template in the registration image, to acquire the registration image information, and the authentication image information acquisition unit is configured to extract, as the authentication partial image, a region in the predetermined positional relationship with a region corresponding to the authentication template in the authentication image, to acquire the authentication image information.

8. A tracking system configured to track an individual object that undergoes a first stage, a second stage, and a treatment and/or processing between the first stage and the second stage, the tracking system comprising:

a treatment/processing device that applies a treatment and/or processing to the individual object between the first stage and the second stage to change an appearance of the individual object;

a first imaging device that images an individual object in the first stage to generate a registration image;

a registration image information acquisition unit configured to extract a registration partial image from the registration image with use of a registration template to acquire registration image information;

a second imaging device that images an individual object in the second stage to generate an authentication image;

an authentication image information acquisition unit configured to extract an authentication partial image from the authentication image with use of an authentication template to acquire authentication image information, the authentication template corresponding to the registration template, and having, with respect to the registration template, a difference in accordance with the treatment and/or processing; and an authentication unit configured to determine whether the authentication image information and the registration image information represent a same individual object to authenticate the individual object to be authenticated.

\* \* \* \* \*